(12) United States Patent
Li et al.

(10) Patent No.: US 7,755,861 B1
(45) Date of Patent: Jul. 13, 2010

(54) METHOD AND SYSTEM FOR PROVIDING A MAGNETIC RECORDING MEDIA

(75) Inventors: Shaoping Li, Fremont, CA (US); Zhigang Bai, Fremont, CA (US); Sining Mao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 425 days.

(21) Appl. No.: 11/951,670

(22) Filed: Dec. 6, 2007

(51) Int. Cl.
*G11B 5/02* (2006.01)
(52) U.S. Cl. ...................................................... 360/59
(58) Field of Classification Search .................. 360/59, 360/71, 110, 131, 125.75; 428/832, 831.2, 428/694 T; 369/300
See application file for complete search history.

(56) References Cited

U.S. PATENT DOCUMENTS

| | | | |
|---|---|---|---|
| 6,667,116 B1* | 12/2003 | Uwazumi et al. | 428/832 |
| 6,671,127 B2* | 12/2003 | Hsu et al. | 360/125.75 |
| 6,754,020 B1 | 6/2004 | Hikosaka et al. | |
| 6,982,844 B2* | 1/2006 | Rettner et al. | 360/59 |
| 7,158,346 B2 | 1/2007 | Liu et al. | |
| 7,289,422 B2* | 10/2007 | Rettner et al. | 369/300 |
| 7,294,419 B2* | 11/2007 | Shin et al. | 428/832 |
| 2004/0107426 A1 | 6/2004 | Sato et al. | |
| 2004/0146747 A1* | 7/2004 | Nemoto et al. | 428/694 T |
| 2005/0016836 A1 | 1/2005 | Kuo et al. | |
| 2005/0157597 A1 | 7/2005 | Sendur et al. | |
| 2006/0024432 A1 | 2/2006 | Nolan et al. | |
| 2006/0062132 A1 | 3/2006 | Van Kesteren | |
| 2006/0093867 A1* | 5/2006 | Takenoiri et al. | 428/831.2 |
| 2006/0154110 A1 | 7/2006 | Hohlfeld et al. | |
| 2006/0222904 A1 | 10/2006 | Hsia et al. | |
| 2008/0037171 A1* | 2/2008 | Mukherjee et al. | 360/131 |
| 2008/0068748 A1* | 3/2008 | Olson et al. | 360/110 |

* cited by examiner

*Primary Examiner*—Fred Tzeng

(57) ABSTRACT

A method and system for providing a magnetic recording medium is disclosed. The magnetic recording medium includes a plurality of regions. Each region corresponds to a bit and includes at least one grain. The grain(s) include a plurality of magnetic layers and at least one interlayer between the magnetic layers. The grain(s) have a thickness less than an exchange length of each of the magnetic layers. In addition, at least one of the magnetic layers has a coercivity different from another of the magnetic layers.

21 Claims, 6 Drawing Sheets

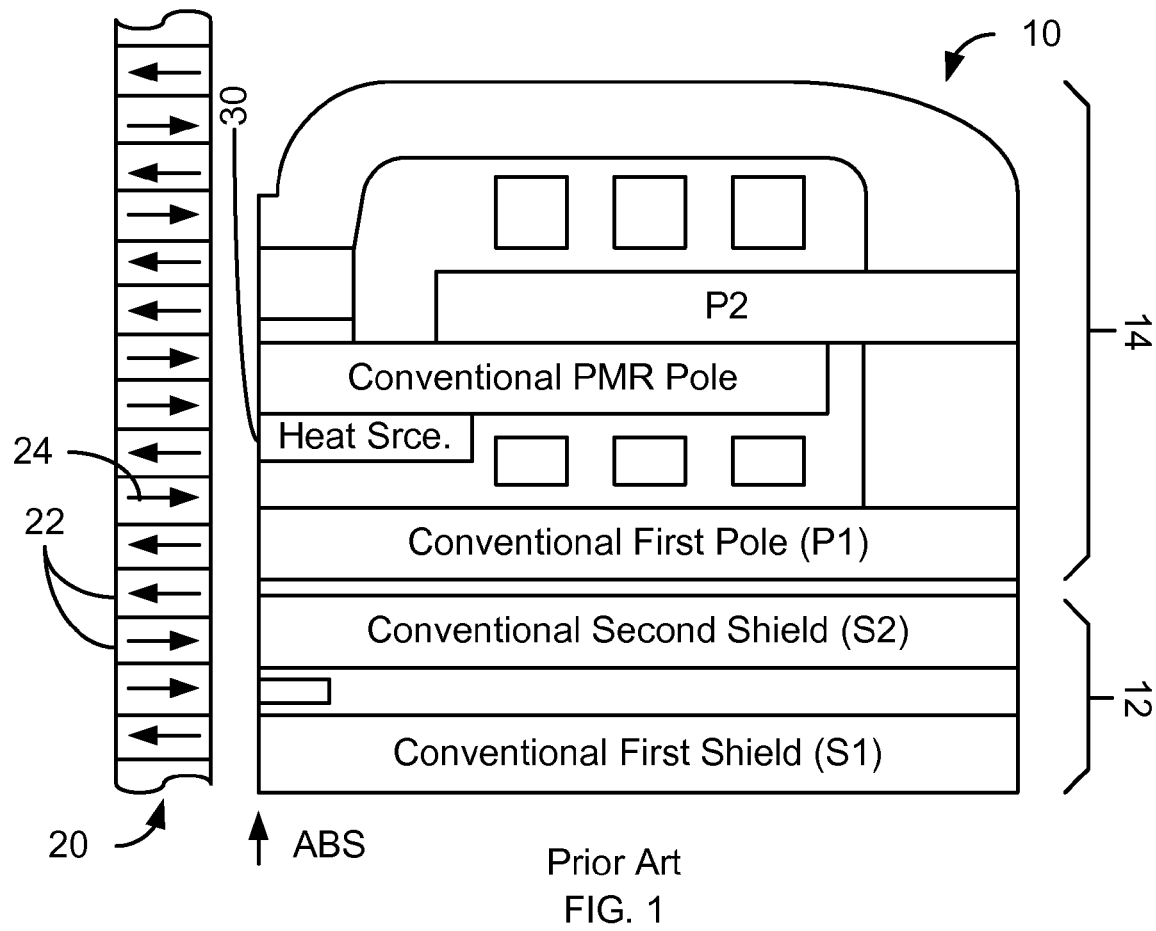
Prior Art
FIG. 1
Prior Art
FIG. 2

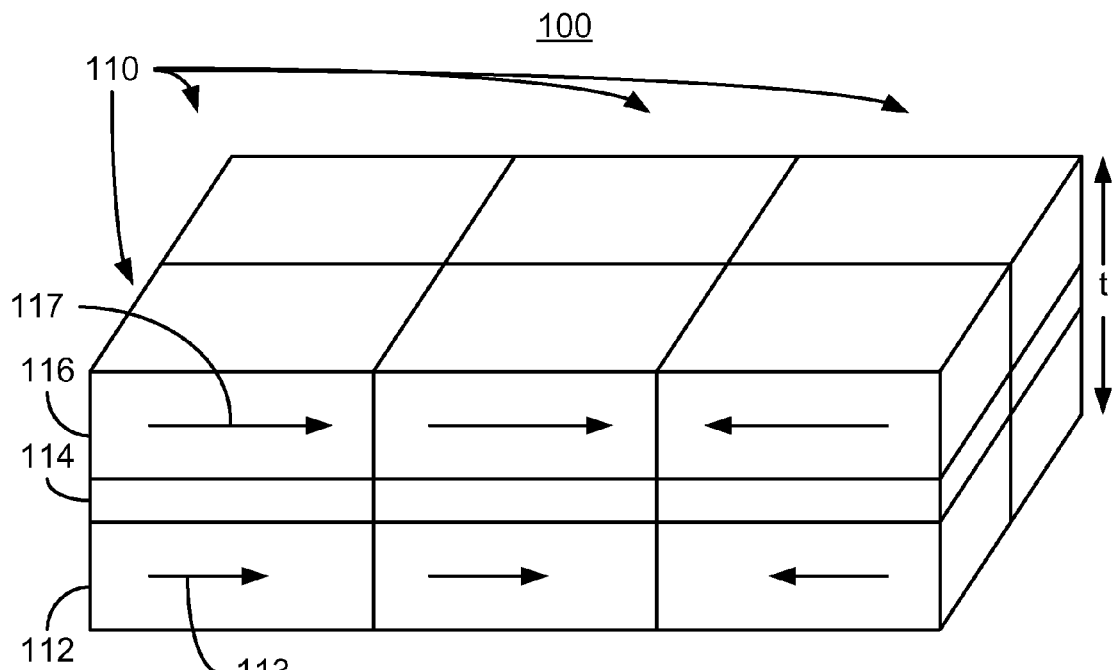
FIG. 3
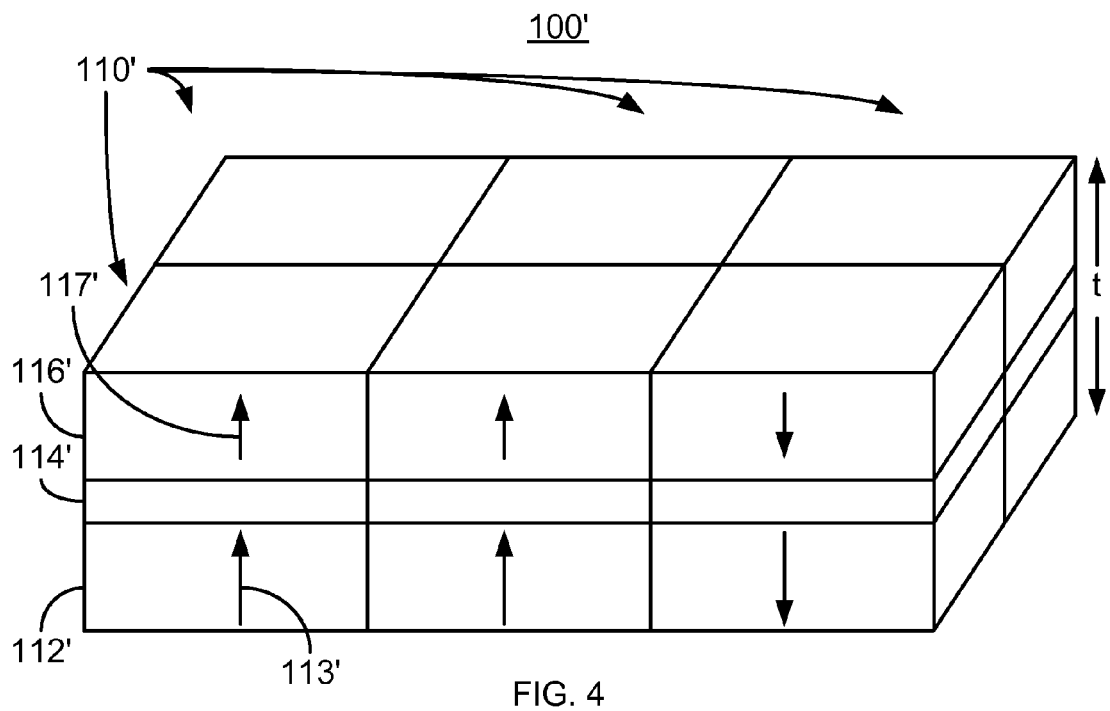
FIG. 4

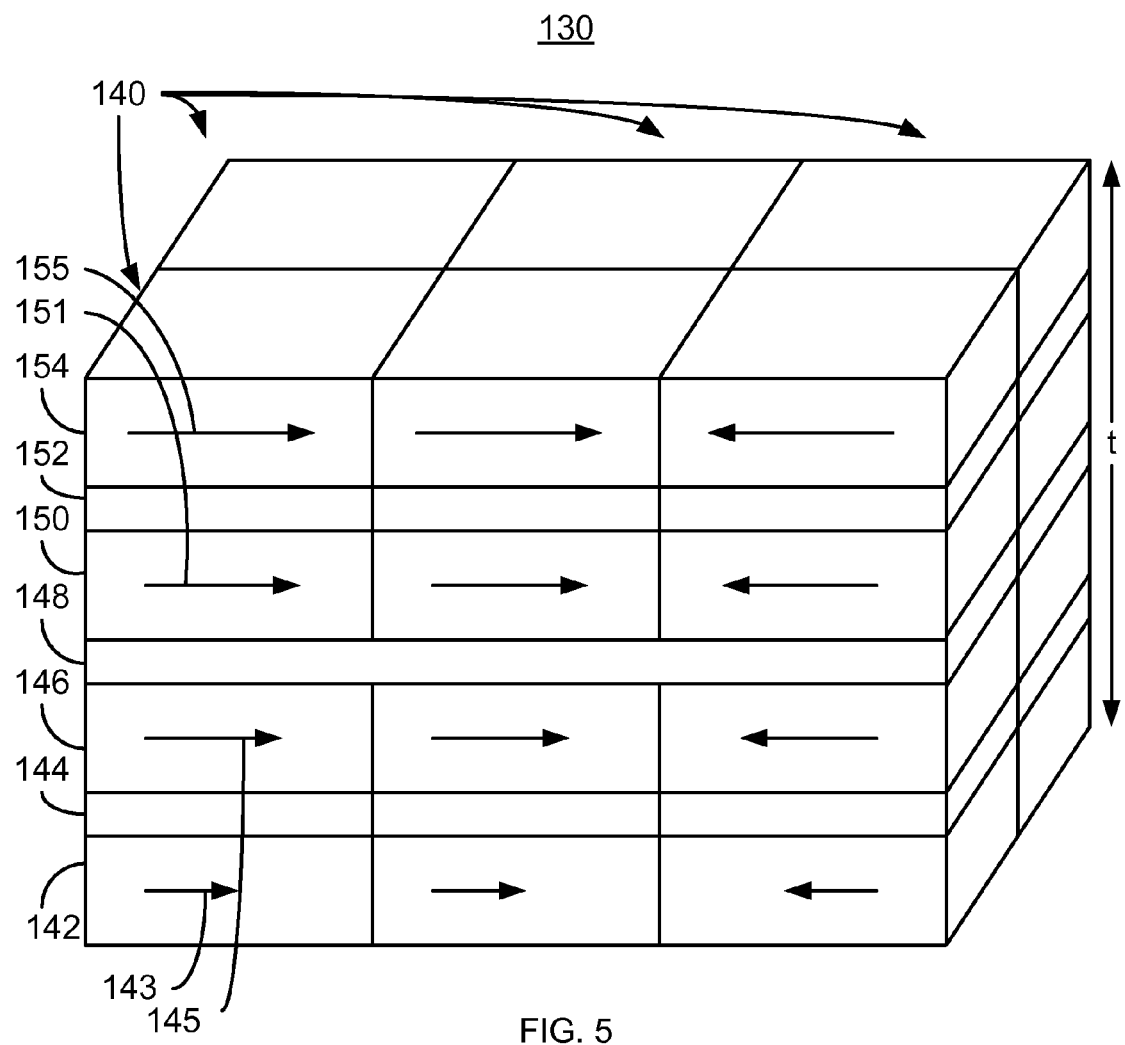
FIG. 5

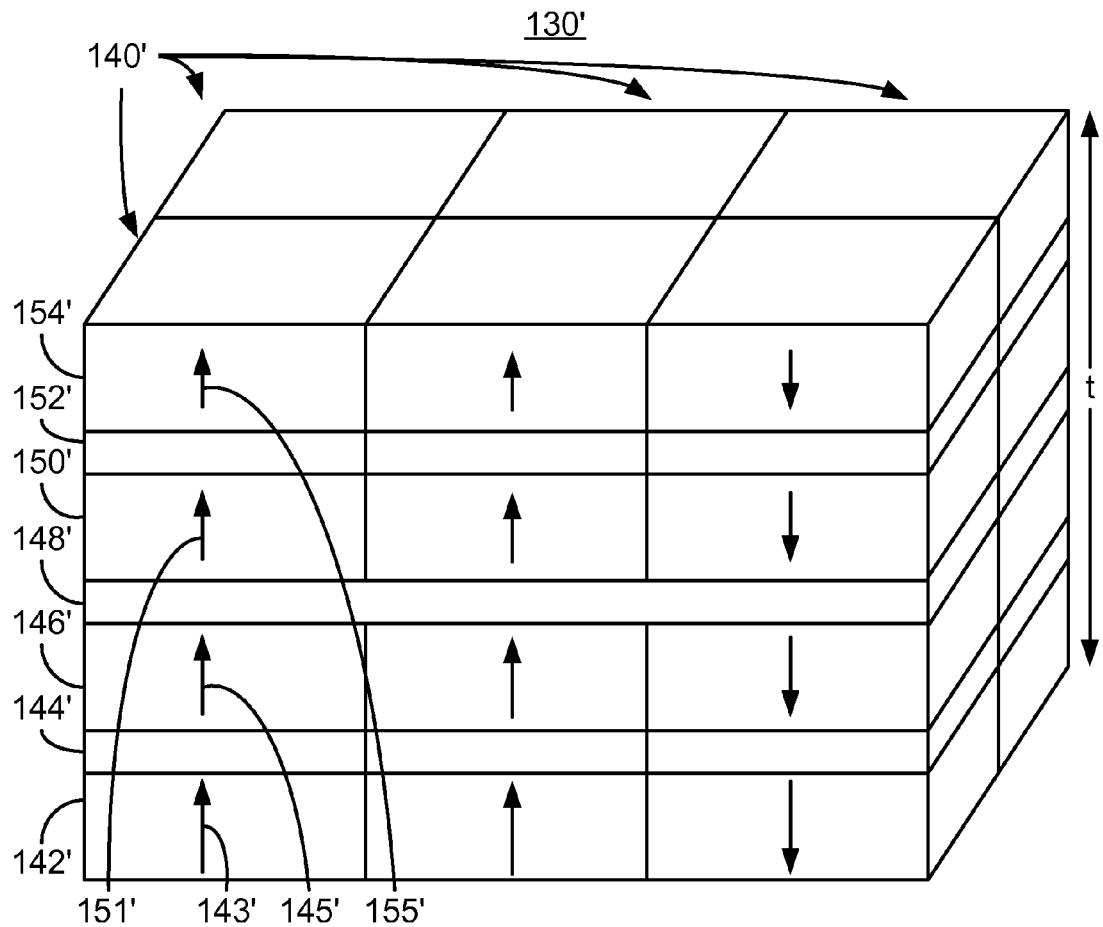
FIG. 6
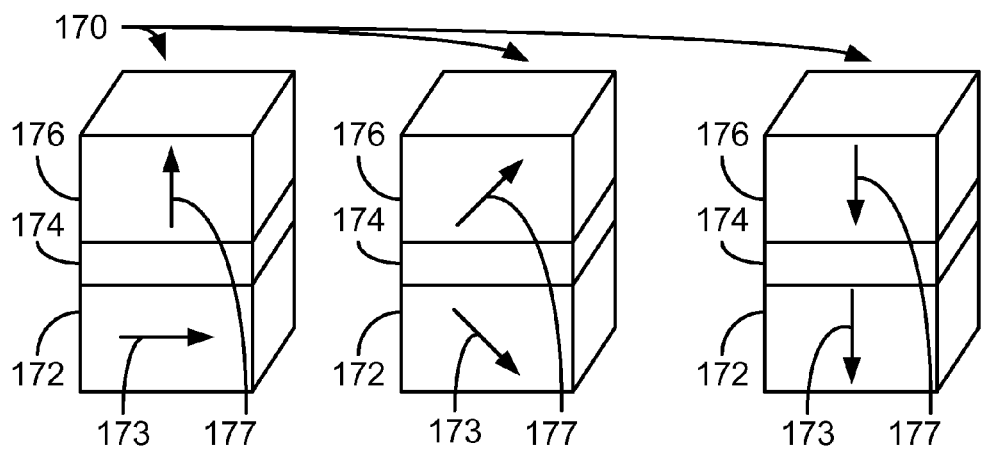
FIG. 7

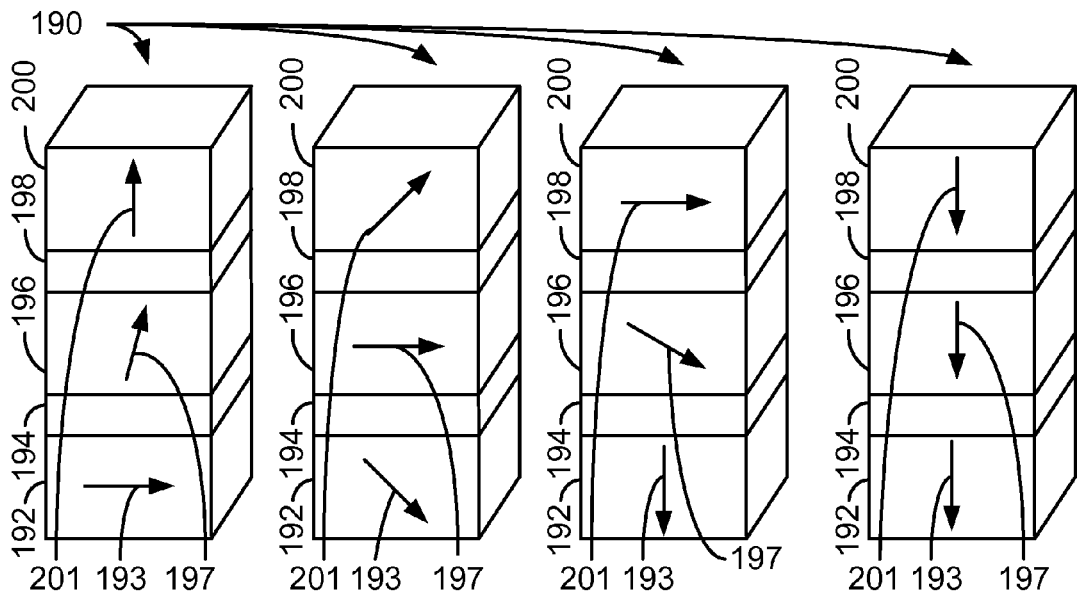
FIG. 8
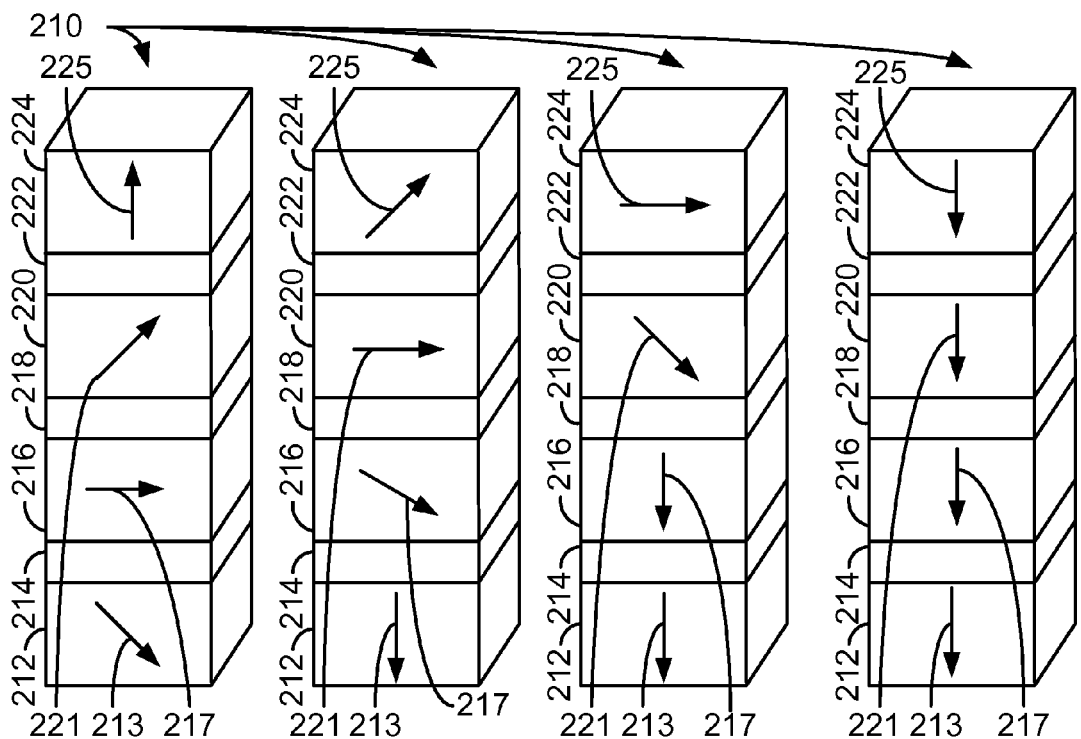
FIG. 9

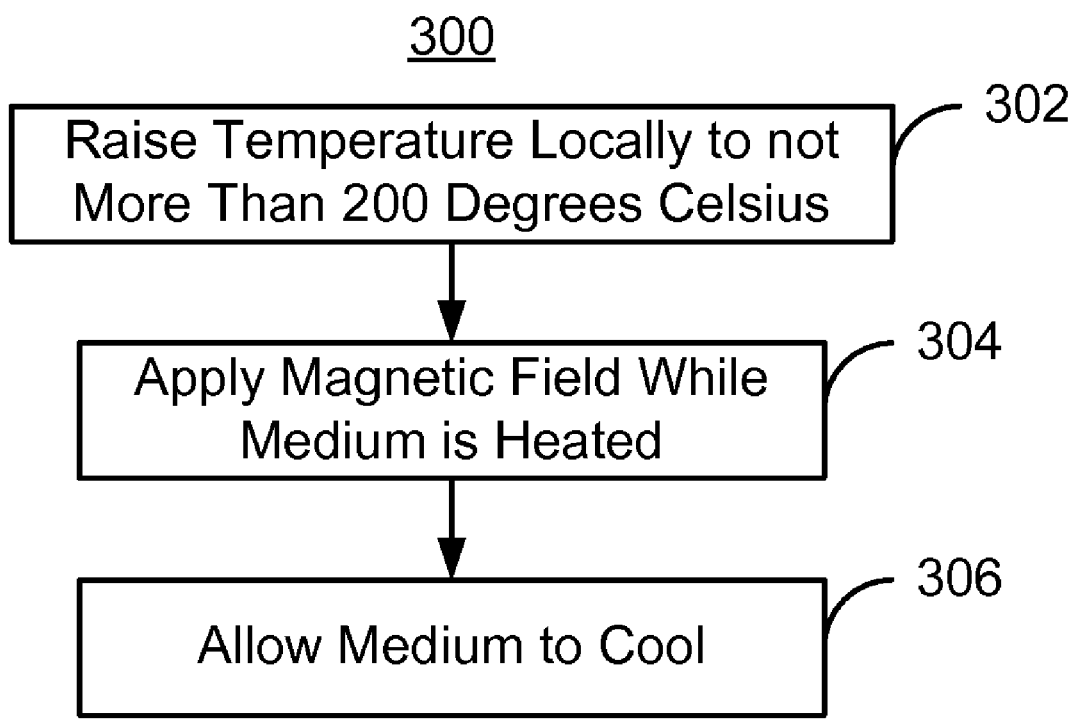
FIG. 10

METHOD AND SYSTEM FOR PROVIDING A MAGNETIC RECORDING MEDIA

BACKGROUND

FIG. 1 depicts a conventional perpendicular magnetic recording (PMR) head 10 and a conventional PMR medium 20. The conventional PMR head 10 may include a read transducer 12 and a write transducer 14. The conventional PMR medium 20 includes bits 22 each of which has a magnetization 24. The conventional PMR medium 20 may be one which is configured to be used heat assisted magnetic recording is used. Consequently, a heat source 30, which may also be part of the head 10, is also shown.

FIG. 2 depicts a conventional method 50 for using the conventional PMR medium 20. The conventional head source 30 is used to heat the conventional PMR medium 20 to near the Curie temperature of the material in the region of the bit being recorded, via step 52. Consequently, the magnetization of the bit being recorded drops to near zero. While the conventional PMR medium 20 is heated, a magnetic field in the desired direction of the magnetization 24 of the bit is applied to the bit being recorded, via step 54. The bit 22 being recorded is cooled in the presence of the field, via step 56. Consequently, the magnetization 24 of the bits 22 can be set in the desired direction.

Although the conventional PMR medium 20 may be recorded using the conventional method 50, one of ordinary skill in the art will readily recognize that the conventional method may not function as desired. The conventional PMR medium 20 is believed to undergo switching through coherent rotation. Such switching typically requires a large switching field and may result in poor writeability. Consequently, the method 50 heats the PMR medium 20 to near the Curie temperature. In order to do so, the local temperature of the conventional PMR medium 20 may rise to above five hundred degrees Celsius in the region of the bit 22 being recorded. Such a high temperature typically consumes a large amount of power. In addition, lubricants that might otherwise be used for the conventional PMR medium 20 may not function at such high temperatures. Consequently, the conventional PMR medium 20 and the conventional PMR recording head 10 using the conventional heat source 30 may be unreliable.

Accordingly, what is needed is a system and method for improving heat assisted magnetic recording.

BRIEF SUMMARY OF THE INVENTION

A method and system for providing a magnetic recording medium is disclosed. The magnetic recording medium includes a plurality of regions. Each region corresponds to a bit and includes at least one grain. The grain(s) include a plurality of magnetic layers and at least one interlayer between the magnetic layers. The grain(s) have a thickness less than an exchange length of each of the magnetic layers. In addition, at least one of the magnetic layers has a coercivity different from another of the magnetic layers.

BRIEF DESCRIPTION OF SEVERAL VIEWS OF THE DRAWINGS

FIG. 1 is a diagram of a conventional magnetic recording system.

FIG. 2 is a flow chart depicting a conventional method for performing magnetic heat-assisted recording.

FIG. 3 depicts an exemplary embodiment of a magnetic recording medium usable in heat assisted recording.

FIG. 4 depicts another exemplary embodiment of a magnetic recording medium usable in heat assisted recording.

FIG. 5 depicts another exemplary embodiment of a magnetic recording medium usable in heat assisted recording.

FIG. 6 depicts another exemplary embodiment of a magnetic recording medium usable in heat assisted recording.

FIG. 7 depicts an exemplary embodiment of a grain of a magnetic recording medium usable in heat assisted recording during switching.

FIG. 8 depicts another exemplary embodiment of a grain of a magnetic recording medium usable in heat assisted recording during switching.

FIG. 9 depicts another exemplary embodiment of a grain of a magnetic recording medium usable in heat assisted recording during switching.

FIG. 10 is a flow chart depicting an exemplary embodiment of a method for performing magnetic heat-assisted recording using an embodiment of magnetic recording medium.

DETAILED DESCRIPTION OF THE PREFERRED EMBODIMENTS

FIGS. 3-6 depict exemplary embodiments of a magnetic recording media usable in heat assisted recording. Referring to FIG. 3, a magnetic recording medium 100 is shown. For simplicity, FIG. 3 is not drawn to scale. In addition, other layers (not shown) might be included. The magnetic recording medium 100 includes multiple grains 110. For clarity, the grains 110 are depicted as rectangles. However, one of ordinary skill in the art will recognize that the grains 110 generally have a different shape. Fr simplicity, components of only one grain 110 are labeled. In addition, the grains 110 extend through the magnetic layers of the magnetic recording medium 100. When used as a recording medium, each bit includes one or more of the grains 110.

Each grain 110 includes multiple magnetic layers with interlayers interleaved between the magnetic layers. In addition, there is a distribution of magnetizations and/or coercivities for the magnetic layers that varies with the depth of the layer in the grain. For example, at least one magnetic layer may have a different coercivity of another magnetic layer. In one embodiment, the distribution of coercivities may increase or decrease through the depth of the grain 110. For example, the top magnetic layer may have the highest coercivity, while the bottom magnetic layer has the lowest coercivity, or vice versa. In one embodiment, at least one of the magnetic layers has a different magnetization than another of the layers. In one embodiment, the distribution of magnetizations may increase or decrease through the depth of the grain 110. For example, the top magnetic layer may have the highest magnetization while the bottom magnetic layer has the lowest magnetization, or vice versa. Moreover, the magnetizations of the magnetic layers may be in plane (of the layers), perpendicular to the plane, or tilted at an angle to the plane of the layers. In another embodiment, both the magnetization and coercivity may vary through the thickness of the grain 110. In such a case, the magnetizations and coercivities may both increase, both decrease, or one increase while the other decreases through the depth of the grain 110. In addition, the thickness of the grain 110 is less than the exchange length of at least one of the magnetic layers.

In one embodiment, the interlayer(s) in a grain 110 may include a nonmagnetic material, in which the bulk material is not magnetic. In another embodiment, the interlayer(s) in a grain 110 may be formed of a magnetic material. In such an embodiment, each interlayer is sufficiently thin that it has no net magnetic moment (no spontaneous net magnetization for the layer). For example, each interlayer may have a thickness of approximately at least one and not more than two monolayers. The interlayers in a grain 110 are also sufficiently thin to allow exchange coupling between the magnetic layers. In one embodiment, the interlayers are configured such that the exchange interaction between the magnetic layers is smaller than the spin-spin exchange interaction of one magnetic layer.

In the embodiment shown in FIG. 3, the grain 110 includes two magnetic layers 112 and 116, which are separated by an interlayer 114. The thickness, t, of the grain 110 is less than the exchange length for at least one of the magnetic layer 112 or 116. Thus, in one embodiment, the thickness of the grain 110 is less than the exchange length(s) of the magnetic layer 112 and the magnetic layer 116. In another embodiment, the thickness of the grain 110 is less than the exchange length of the magnetic layer 112. In yet another embodiment, the thickness of the grain 110 is less than the exchange length of the magnetic layer 116. Thus, in one embodiment, the thickness of the grain 110 is not more than approximately thirty five nanometers. In addition, in one embodiment, the lateral grain size is on the order of at least four nanometers and not more than ten nanometers.

For the magnetic layers 112 and 116, at least one of the magnetization and coercivity varies with the depth of grain 110. In one embodiment, the magnetic layers 112 and 116 may have different coercivities. For example, the top magnetic layer 116 may have a higher coercivity than the bottom magnetic layer 112. Alternatively, the top magnetic layer 116 may have a lower coercivity than the bottom magnetic layer 112. In one embodiment, the magnetic layers 112 and 116 may have different magnetizations. For example, the top magnetic layer 116 may have a higher magnetization than the bottom magnetic layer 112. Alternatively, the top magnetic layer 116 may have a lower magnetization than the bottom magnetic layer 112. In another embodiment, both the magnetizations and coercivities may be different for the magnetic layers 112 and 116.

Arrows 113 and 117 for each grain 110 depict the magnetization and/or coercivity distribution. The arrows 113 and 117 may thus be considered to represent the magnetization and/or the coercivity of the layer 112 and 116, respectively. In the embodiment shown, the magnetization/coercivity 117 of the top magnetic layer 116 is higher than the magnetization/coercivity 113 of bottom magnetic layer 112. Alternatively, the top magnetic layer 116 may have a lower magnetization/coercivity 117 than the bottom magnetic layer 112. In another embodiment, both the magnetizations and coercivities may vary through the thickness of the grain 110.

The interlayer 114 has a thickness that is configured to allow exchange coupling between the magnetic layers 112 and 116. In one embodiment the thickness is greater than zero and not more than three nanometers. For example, the exchange coupling may be at least $10^{-7}$ emu/cm$^3$ and not more than $10^{-3}$ emu/cm$^3$. In one embodiment, the interlayer 114 is configured such that the exchange interaction between the magnetic layers 112 and 116 is smaller than the spin-spin exchange interaction of one magnetic layer 112 and/or 116. In one embodiment, the interlayer 114 includes at least one of Cr, Pt, O2, N, B, Pt, Zr, Si, Ru, Ta, a nonmagnetic oxide, and a nonmagnetic nitride. In another embodiment, the interlayer 114 may include a magnetic alloy and is sufficiently thin that the magnetic alloy has no net magnetization. For example, the interlayer 114 may have a thickness of approximately at least one and not more than two monolayers.

FIG. 4 depicts another exemplary embodiment of a magnetic recording medium 100' usable in heat assisted recording. For simplicity, FIG. 4 is not drawn to scale. In addition, other layers (not shown) might be included. The magnetic recording medium 100' includes multiple grains 110'. For clarity, the grains 110' are depicted as rectangles. However, one of ordinary skill in the art will recognize that the grains 110' generally have a different shape. In addition, for simplicity, components of only one grain 110' are labeled. In addition, the grains 110' extend through the magnetic layers of the magnetic recording medium 100'. When used as a recording medium, each bit includes one or more of the grains 110'.

The magnetic recording medium 100' is analogous to the magnetic recording medium 100 depicted in FIG. 3. Consequently, the layers 112', 114', and 116' correspond to the layers 112, 114, and 116. However, the magnetizations of the layers 114' and 116' do not lie in the plain of the layers. Instead, the perpendicular anisotropy of the layers 112' and 116' is such that the magnetizations are perpendicular to the plane of the layers. Consequently, the arrows 113' and 117' depicting the magnetization and/or coercivity distribution are shown perpendicular to the plane of the layers. In another embodiment (not shown), the magnetizations could lie between the in-plane case shown in FIG. 3 and the perpendicular to plane case shown in FIG. 4. In addition, in the embodiment shown in FIG. 4, the magnetization/coercivity 113' of the lower layer 112' is greater than the magnetization/coercivity 117' of the upper layer 116'. In an alternate embodiment, the magnetization/coercivity 113' of the lower layer 112' may be less than or equal to the magnetization/coercivity 117' of the upper layer 116'.

FIG. 5 depicts another exemplary embodiment of a magnetic recording medium 130 usable in heat assisted recording. For simplicity, FIG. 5 is not drawn to scale. In addition, other layers (not shown) might be included. The magnetic recording medium 130 includes multiple grains 140. For clarity, the grains 140 are depicted as rectangles. However, one of ordinary skill in the art will recognize that the grains 140 generally have a different shape. In addition, for simplicity, components of only one grain 140 are labeled. In addition, the grains 140 extend through the magnetic layers of the magnetic recording medium 130. When used as a recording medium, each bit includes one or more of the grains 140.

The magnetic recording medium 130 is analogous to the magnetic recording media 100 and 100' depicted in FIGS. 3 and 4. However, the magnetic recording medium 130 includes four magnetic layers 142, 146, 150, and 154, which are separated by interlayers 144, 148, 152, and 156. The thickness, t, of the grain 140 is less than the exchange length for at least one of the magnetic layer 142, 146, 150, and 154. Thus, in one embodiment, the thickness of the grain 140 is less than the exchange length(s) of each of the magnetic layers 142, 146, 150, and 154. In another embodiment, the thickness of the grain 140 is less than the exchange length of the magnetic layer 142, 146, 150, or 154. Thus, in one embodiment, the thickness of the grain 140 is not more than approximately thirty five nanometers. In addition, in one embodiment, the lateral grain size is on the order of at least four nanometers and not more than ten nanometers.

For the magnetic layers 142, 146, 150, and 154, at least one of the magnetization and coercivity varies with the depth of grain 140. In one embodiment, the magnetic layers 142, 146, 150, and 154 may all have different coercivities. For example, the top magnetic layer 154 may have a higher coercivity than the next layer 150. The magnetic layer 150 may have a higher coercivity than the next layer 146. The magnetic layer 146 may have a higher coercivity than the bottom magnetic layer 142. Alternatively, the top magnetic layer 154 may have the lowest coercivity. The next layer 150 may have the next lowest coercivity. The next layer 146 may have the second highest coercivity, and the bottom magnetic layer 142 may have the highest coercivity. In another embodiment, the coercivities need not monotonically increase or decrease from top to bottom.

In one embodiment, the magnetic layers 142, 146, 150, and 154 may have different magnetizations. In one embodiment, the magnetic layers 142, 146, 150, and 154 may all have different magnetizations. For example, the top magnetic layer 154 may have a higher magnetization than the next layer 150. The magnetic layer 150 may have a higher magnetization than the next layer 146, which has a higher magnetization than the bottom magnetic layer 142. Alternatively, the top magnetic layer 154 may have the lowest magnetization. The next layer 150 may have the next lowest magnetization. The next layer 146 may have the second highest magnetization and the bottom magnetic layer 142 may have the highest magnetization. In another embodiment, the magnetization need not monotonically increase or decrease from top to bottom. In another embodiment, both the magnetizations and coercivities may be different for the magnetic layers 142, 146, 150, and 154.

Arrows 143, 147, 151, and 155 for each grain 140 depict the magnetization and/or coercivity distribution. The arrows 143, 147, 151, and 155 may thus be considered to represent the magnetization and/or the coercivity of the layer 142, 146, 150, and 154, respectively. In the embodiment shown, the magnetization/coercivity 155 of the top magnetic layer 116 is higher than the magnetization/coercivity 151 of the next magnetic layer 150, and so on. Alternatively, the top magnetic layer 154 may have a lower magnetization/coercivity 155 than the next magnetic layer 150, and so on. In another embodiment, both the magnetizations and coercivities may vary through the thickness of the grain 140.

The interlayers 144, 148, and 152 each has a thickness that is configured to allow exchange coupling between the magnetic layers 142, 146, 150, and 154. In one embodiment the thickness is greater than zero and not more than three nanometers. The exchange coupling may, for example, be least $10^{-7}$ emu/cm$^3$ and not more than $10^{-3}$ emu/cm$^3$. In one embodiment, the interlayers 144, 148, and 152 are configured such that the exchange interaction between the magnetic layers 142, 146, 150, and 154 is smaller than the spin-spin exchange interaction of one magnetic layer 142, 146, 150, and/or 154 but larger than the magnitude of the intrinsic spin-orbit coupling of the magnetic layer 142, 146, 150, and/or 154. In one embodiment, the interlayer 144, 148, and 152 includes at least one of Cr, Pt, O2, N, B, Pt, Zr, Si, Ru, Ta, a nonmagnetic oxide, and a nonmagnetic nitride. In another embodiment, the interlayer 144, 148, and 152 may include a thin magnetic alloy which may have a thickness of approximately at least one monolayer and not more than two monolayers.

FIG. 6 depicts another exemplary embodiment of a magnetic recording medium 140' usable in heat assisted recording. For simplicity, FIG. 6 is not drawn to scale. In addition, other layers (not shown) might be included. The magnetic recording medium 130' includes multiple grains 140'. For clarity, the grains 140' are depicted as rectangles. However, one of ordinary skill in the art will recognize that the grains 140' generally have a different shape. In addition, for simplicity, components of only one grain 140' are labeled. In addition, the grains 140' extend through the magnetic layers of the magnetic recording medium 130'. When used as a recording medium, each bit includes one or more of the grains 140'.

The magnetic recording medium 130' is analogous to the magnetic recording medium 130 depicted in FIG. 5. Consequently, the layers 142', 144', 146', 148', 150', 152', and 154' correspond to the layers 142, 144, 146, 148, 150, 152, and 154. However, the magnetizations of the layers 142', 146', 150', and 154' do not lie in the plain of the layers. Instead, the perpendicular anisotropy of the layers 142', 146', 150', and 154' is such that the magnetizations are perpendicular to the plane of the layers. Consequently, the arrows 143', 147', 151', and 155' depicting the magnetization and/or coercivity distribution are shown perpendicular to the plane of the layers. In another embodiment (not shown), the magnetizations could lie between the in-plane case shown in FIG. 5 and the perpendicular to plane case shown in FIG. 6. In addition, in the embodiment shown in FIG. 6, the magnetizations/coercivities 143', 147', 151', and 151' vary from high to low through the depth of the grain 140'. In an alternate embodiment, the magnetization/coercivity 143', 147', 151', and 151' may vary from low to high.

The magnetic recording media 100, 100', 130, and 130' include grains 110, 110', 140, and 140', respectively, having multiple layers. Although two and five magnetic layers are shown for the grains 110, 110', 140, and 140', another number of magnetic layers may be used. In addition, the grains 110, 110', 140, and 140' have a distribution in the magnetization and/or coercivity. In one embodiment, the magnetization and/or coercivity increase as depth increases. In another embodiment, the magnetization and/or coercivity may decrease as the depth increases.

Because of the configuration of the magnetic recording media 100, 100', 130, and 130' and may undergo an incoherent switching process. In one embodiment, the distribution in the magnetization and/or coercivity, particularly in connection with the exchange coupling between layers, may result in incoherent switching. For example, in one embodiment, a quasi-buckling or quasi-curling process may be the switching mechanism.

Examples of incoherent switching processes for the grains 110, 110', 140, and/or 140' may be seen in FIGS. 7-9. For example, FIG. 7 depicts an exemplary embodiment of a grain 170 usable in heat assisted recording during switching. For simplicity, FIG. 7 is not drawn to scale. The grain 170 is analogous to the grain 110/110' in the recording medium 100/100' during switching. Consequently, the grain 170 has magnetic layers 172 and 176 separated by an interlayer 174. These layers 172, 174, and 176 are analogous to layers 112, 114, and 116, respectively. The arrows 173 and 177 depict the directions of the magnetizations of the layers 172 and 176, respectively. In addition, the coercivity and/or magnetization of the layer 172 is smaller than the coercivity and/or magnetization of the layer 176. The exchange coupling between the magnetic layers 172 and 176 may also be tailored through the interlayer 174, as described above.

Because of the configuration of the grain 170, the magnetic layer 172 commences switching first. The layer 176 also starts switching before the magnetic layer 172 has completed switching. Finally, the magnetizations 173 and 177 of both layers 172 and 176 have switched.

Similarly, FIG. 8 depicts another exemplary embodiment of a grain 190 in a magnetic recording medium usable in heat assisted recording during switching. For simplicity, FIG. 8 is not drawn to scale. The grain 190 includes three magnetic layers 192, 196, and 200 interleaved with interlayers 194 and 198. The layers 192, 196 and 200 are analogous to the magnetic layers in the grains 110, 110', 140, and 140', while the layers 194 and 198 are analogous to the interlayers in the grains 110, 110', 140, and 140'. Thus, there is a distribution of coercivity and/or magnetization between the layers 192, 196, and 200. In addition, the exchange coupling between the magnetic layers 192, 196, and 200 may also be tailored through the interlayers 194 and 196, as described above. In the embodiment shown, the coercivity and/or magnetization of the layer 192 is the lowest. The layer 196 has a middle coercivity and/or magnetization. The coercivity and/or magnetization of the layer 200 is the highest. The arrows 193, 197, and 201 depict the direction of magnetization for the magnetic layers 192, 196, and 200, respectively. Although not shown, the magnetizations 193, 197, and 181 would start out aligned and pointing up. Because it has the lowest magnetization and/or coercivity, the magnetization direction 193 of the layer 192 commences switching first. The middle magnetic layer 196 starts switching next, followed by the top magnetic layer 200. Consequently, the arrow 193 rotates to the downward direction first, then the arrow 197, and finally the arrow 201.

FIG. 9 depicts another exemplary embodiment of a grain 210 of a magnetic recording medium usable in heat assisted recording during switching. For simplicity, FIG. 9 is not drawn to scale. The grain 210 is analogous to the grain 140/140' in the recording medium 130/130' during switching. Consequently, the grain 210 has magnetic layers 212, 216, 220, and 224 separated by nonmagnetic spacer layers 214, 218, and 222. The arrows 213, 217, 221, and 225 depict the directions of the magnetizations of the layers 212, 216, 220 and 224, respectively. In addition, there is a distribution of the coercivities and/or magnetizations between the magnetic layers 212, 216, 220, and 224. The exchange coupling between the magnetic layers 212, 216, 220 and 224 may also be tailored through the interlayers 214, 218, and 222, as described above. The coercivity and/or magnetization of the layer 212 is smaller than the coercivity and/or magnetization of the layer 216. The coercivity and/or magnetization of the layer 216 is smaller than the coercivity and/or magnetization of the layer 220. Finally, the coercivity and/or magnetization of the layer 220 is smaller than the coercivity and/or magnetization of the layer 224. Although not depicted, the magnetizations for the layers 212, 216, 220, and 224 would start out aligned and pointing up. Because it has the lowest magnetization and/or coercivity, the magnetization direction 213 of the layer 212 commences switching first. The magnetic layer 216 starts switching next, followed by the magnetic layer 220, and then followed by the top magnetic layer 224. Consequently, the arrow 213 rotates to the downward direction first, then the arrows 217, 221, and 225 in order.

Thus, the grains 110, 110', 140, 140', 170, 190, and 210 may switch incoherently. Stated differently, switching is achieved through a multi-step process in which layers in a grain 110, 110', 140, 140', 170, 190, and 210 commence switching individually. In one embodiment, this incoherent switching may be achieved by providing a distribution of coercivities of the magnetic layers in a grain 110, 110', 140, 140', 170, 190, and 210 in connection with a reduced exchange coupling between the magnetic layers of the grain 110, 110', 140, 140', 170, 190, and 210. As mentioned above, in one embodiment, the exchange coupling is based on the thickness of the interlayers between the magnetic layers and may be at least $10^{-7}$ emu/cm$^3$ and not more than $10^{-3}$ emu/cm$^3$. Such a range of the exchange coupling may allow incoherent switching in the desired modes, while increasing the probability that undesirable modes that are less thermally stable, such as a quasi-fanning process, may be avoided. Thus, thermally stable grains 110, 110', 140, 140', 170, 190, and 210 that may switch incoherently are present in the recording media.

The incoherent switching process may have a reduced switching field, particularly at a moderate temperature. The expected reduction in switching field may be more than expected for a tiled recording process switched using Stoner-Wohlfarth coherent rotation. The moderate temperature is believed to introduce and increase the speed of incoherent switching modes such as incoherent quasi-buckling and quasi-curling. Thus, the media 100, 100', 130, and 130' and/or media including grains 170, 190, and 210 may be used at a slightly elevated temperature. In one embodiment, the elevated temperature is not more than two hundred degrees Celsius in the local region of the bit being written. In one embodiment, the elevated temperature is not more than one hundred fifty degrees Celsius. In one embodiment, a twenty to thirty Oe per degree Celsius drop in the coercivity might be achieved. Because the incoherent switching process is a multi-step process, a small increase in the temperature may allow a small magnetic field to initiate switching in the grains 110, 110', 140, 140', 170, 190, and 210 that are otherwise thermally stable. It is also expected that perpendicular recording may be particularly assisted by use of the media 100, 100', 110', 130, and/or 130'. As a result, the magnetic recording media 100, 100', 130, and/or 130' including grains 110, 110', 140, 140', 170, 190, and/or 210 may be thermally stable when not heated, but switch at a lower field when heated to a moderate temperature.

FIG. 10 is a flow chart depicting an exemplary embodiment of a method 300 for performing magnetic heat-assisted recording using an embodiment of magnetic recording medium, for example a medium such as the media 100, 100', 130 and/or 130' that includes grains such as the grains 110, 110', 140, 140', 170, 190, and/or 210. For simplicity, the method 300 is described in the context of the medium 100 including grains 110. However, the method 300 could be used with other media. For simplicity, only certain steps are shown. However, in one embodiment, other steps not inconsistent with the method and system described herein may be used.

The temperature of the recording medium 100 is raised to not more than two hundred degrees Celsius in the local region(s) of the bit(s) being recorded, via step 302. In one embodiment, step 302 raises the temperature locally to at least one hundred and fifty degrees Celsius. While the local temperature is raised in step 302, a magnetic field is applied to the grain(s) 110 in each of the bit(s) being recorded, via step 304. The combination of the moderate temperature increase and the magnetic field applied in steps 302 and 304 allow the grain(s) 110 in the bit(s) being recorded to be switched. Because of the configuration of the grains 110, this switching may be and incoherent, multi-step process. The magnetic medium 100 may be cooled, via step 304. In one embodiment, step 304 is performed in the presence of the switching field.

Because the temperature of the medium 110 is slightly elevated in step 302, switching may occur at a lower magnetic field for the grains 110 of the medium 100. In addition, because of the configuration of the medium 100, the magnetic state of the grains 110 is thermally stable when the combination of the field and elevated temperature are not applied. Moreover, because the medium 100 is elevated to only a moderate temperature, power consumption may be reduced.

Thus, a thermally stable magnetic media 100, 100', 130, 130' may be provided. Because of their configuration, the grains 110, 110', 140, 140', 170, 190, and/or 210 may undergo incoherent switching. This incoherent switching may take place at a lower field, particularly when the temperature of the grains 110, 110', 140, 140', 170, 190, and/or 210 is elevated to a moderate temperature. Because a lower temperature may be used, power consumption may be reduced. Thus, reliability and writeability of the media 100, 100', 130, 130' including grains 110, 110', 140, 140', 170, 190, and/or 210 may be improved.

We claim:

1. A magnetic recording medium comprising:
a plurality of regions, each of the plurality of regions corresponding to a bit and including at least one grain, the at least one grain including a plurality of magnetic layers and at least one interlayer between the plurality of magnetic layers; the at least one grain having a thickness less than an exchange length of each of the plurality of magnetic layers, at least one of the plurality of magnetic layers having a coercivity different from another of the plurality of magnetic layers.

2. The magnetic recording medium of claim 1 wherein the at least one grain is configured to undergo an incoherent rotation in the presence of a magnetic field when an average temperature of the at least one grain is less than two hundred degrees Celsius and more than room temperature.

3. The magnetic recording medium of claim 1 wherein the at least one interlayer includes a nonmagnetic material.

4. The magnetic recording medium of claim 1 wherein the at least one interlayer includes a magnetic material, each of the at least one interlayer having a thickness that is sufficiently small that the at least one interlayer has no net spontaneous magnetization.

5. The magnetic recording medium of claim 1 wherein the plurality of layers includes a top layer and a bottom layer, the top layer having a higher coercivity than the bottom layer.

6. The magnetic recording medium of claim 1 wherein the plurality of layers includes a top layer and a bottom layer, the bottom layer having a higher coercivity than the bottom layer.

7. The magnetic recording medium of claim 1 wherein the plurality of layers includes a top layer and a bottom layer, the top layer having a higher magnetization than the bottom layer.

8. The magnetic recording medium of claim 1 wherein the plurality of layers includes a top layer and a bottom layer, the bottom layer having a higher coercivity than the bottom layer.

9. The magnetic recording medium of claim 1 wherein the at least one interlayer includes at least one of Cr, Pt, O2, N, B, Pt, Zr, Si, Ru, Ta, a nonmagnetic oxide, and a nonmagnetic nitride.

10. The magnetic recording medium of claim 1 wherein the plurality of magnetic layers includes at least one of CoCrX1, CoX2, CoCrX3 wherein X1 is at least one of Ta, Pt, B, C, Nd, Cu, Zr, Fe, Hf, P, O2, Si, Ni, and other nonmagnetic elements, X2 is at least one of CrPt, Cu, $O_2$, N, B, Pt, Zr, Si, Ru, and Ta, and X3 is at least one of C, B, Cr, Pt, O2, Cu, Nd, Ni, and Ti.

11. The magnetic recording medium of claim 1 wherein the each of the plurality of magnetic layers lies substantially parallel to a plane and has a magnetization at angle to the plane, the angle being greater than zero and not more than ninety degrees.

12. A magnetic recording medium comprising:
a plurality of regions, each of the plurality of regions corresponding to a bit and including at least one grain, the at least one grain including a plurality of magnetic layers and at least one interlayer between the plurality of magnetic layers; the at least one grain having a thickness less than an exchange length of each of the plurality of magnetic layers, at least one of the plurality of magnetic layers having a coercivity different from another of the plurality of magnetic layers, the at least one interlayer including at least one of Cr, Pt, O2, N, B, Pt, Zr, Si, Ru, Ta, a nonmagnetic oxide, and a nonmagnetic nitride, each of the plurality of magnetic layers including at least one of CoCrX1, CoX2, CoCrX3 wherein X1 is at least one of Ta, Pt, B, C, Nd, Cu, Zr, Fe, Hf, P, O2, Si, Ni, and other nonmagnetic elements, X2 is at least one of CrPt, Cu, $O_2$, N, B, Pt, Zr, Si, Ru, and Ta, and X3 is at least one of C, B, Cr, Pt, O2, Cu, Nd, Ni, and Ti.

13. A method for recording to a recording medium including a plurality of regions, each of the plurality of regions corresponding to a bit and including at least one grain, the method comprising:
applying a magnetic field to the at least one grain of at least one bit, the at least one grain including a plurality of magnetic layers and at least one interlayer between the plurality of magnetic layers; the at least one grain having a thickness less than an exchange length of each of the plurality of magnetic layers, at least one of the plurality of magnetic layers having a coercivity different from another of the plurality of magnetic layers; and
raising a temperature of the recording medium to not more than two hundred degrees Celsius.

14. The method of claim 13 wherein the raising the temperature further includes raising the temperature to at least one hundred and fifty degrees Celsius.

15. The method of claim 13 wherein the plurality of layers includes a top layer and a bottom layer, the top layer having a higher coercivity than the bottom layer.

16. The method of claim 13 wherein the plurality of layers includes a top layer and a bottom layer, the bottom layer having a higher coercivity than the bottom layer.

17. The method of claim 13 wherein the plurality of layers includes a top layer and a bottom layer, the top layer having a higher magnetization than the bottom layer.

18. The method of claim 13 wherein the plurality of layers includes a top layer and a bottom layer, the bottom layer having a higher coercivity than the bottom layer.

19. The method of claim 13 wherein the at least one interlayer includes at least one of Cr, Pt, O2, N, B, Pt, Zr, Si, Ru, Ta, a nonmagnetic oxide, and a nonmagnetic nitride.

20. The method of claim 13 wherein the plurality of magnetic layers includes at least one of CoCrX1, CoX2, CoCrX3 wherein X1 is at least one of Ta, Pt, B, C, Nd, Cu, Zr, Fe, Hf, P, O2, Si, Ni, and other nonmagnetic elements, X2 is at least one of CrPt, Cu, $O_2$, N, B, Pt, Zr, Si, Ru, and Ta, and X3 is at least one of C, B, Cr, Pt, O2, Cu, Nd, Ni, and Ti.

21. The method of claim 13 wherein the each of the plurality of magnetic layers lies substantially parallel to a plane and includes a magnetization, the magnetization being at an angle to the plane, the angle being greater than zero and not more than ninety degrees.

* * * * *